(12) United States Patent  
Zapinski

(10) Patent No.: US 6,264,352 B1
(45) Date of Patent: Jul. 24, 2001

(54) SUN VISOR AND VANITY MIRROR ASSEMBLY FOR MOTOR VEHICLES

(75) Inventor: Michael J. Zapinski, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/505,945

(22) Filed: Feb. 15, 2000

(51) Int. Cl.[7] .................................................. B60Q 3/00
(52) U.S. Cl. ........................ 362/492; 362/135; 362/140
(58) Field of Search .................................. 362/492, 135, 362/142, 140, 141; 296/97.5

(56) References Cited

U.S. PATENT DOCUMENTS

| | | |
|---|---|---|
| 4,751,618 | 6/1988 | Iacovelli . |
| 4,760,503 | 7/1988 | VandenBerge et al. . |
| 4,984,137 | 1/1991 | Maemura . |
| 5,117,337 | 5/1992 | Sakuma . |
| 5,203,623 | 4/1993 | Viertel et al. . |
| 5,205,635 | 4/1993 | Van Order et al. . |
| 5,205,639 | 4/1993 | White et al. . |
| 5,207,501 | * 5/1993 | Sakuma et al. ...................... 362/137 |
| 5,329,430 | 7/1994 | Lanser et al. . |
| 5,331,518 | * 7/1994 | Roark et al. ......................... 362/144 |
| 5,365,416 | 11/1994 | Peterson . |
| 5,430,624 | 7/1995 | Yoshida et al. . |
| 5,498,056 | 3/1996 | Viertel et al. . |
| 5,560,704 | * 10/1996 | Hiemstra et al. ...................... 362/143 |
| 5,890,792 | 4/1999 | Finn et al. . |
| 6,139,083 | * 10/2000 | Fischer ................................ 362/144 |

* cited by examiner

Primary Examiner—Thomas M. Sember
(74) Attorney, Agent, or Firm—Brooks & Kushman P.C.

(57) ABSTRACT

A sun visor and vanity mirror assembly for automotive vehicles includes a vanity mirror and bezel secured to one surface of a sun visor that is hinged at one margin thereof to a vehicle headliner for a vehicle passenger compartment. A frame surrounds the mirror being secured to the surface of the sun visor. A door for the mirror is hinged on one margin of the frame. The door includes a molding having imbedded electrical connector strips with a terminal exposed on a hinged margin of the door. The frame for the mirror has a connector strip extending from the margin thereof adjacent the hinged axis of the visor. Electrical lamps are located in the door and secured to the interior surface of the door. The connector strips in the door and in the frame define an electric light circuit. A terminal of the embedded conductor in the door engages the connector strip on the frame when the door is pivoted to an open position to expose the mirror. Whereby an electric circuit for the lamps is activated to complete the lamp circuit without a requirement for a mechanical switch.

4 Claims, 2 Drawing Sheets

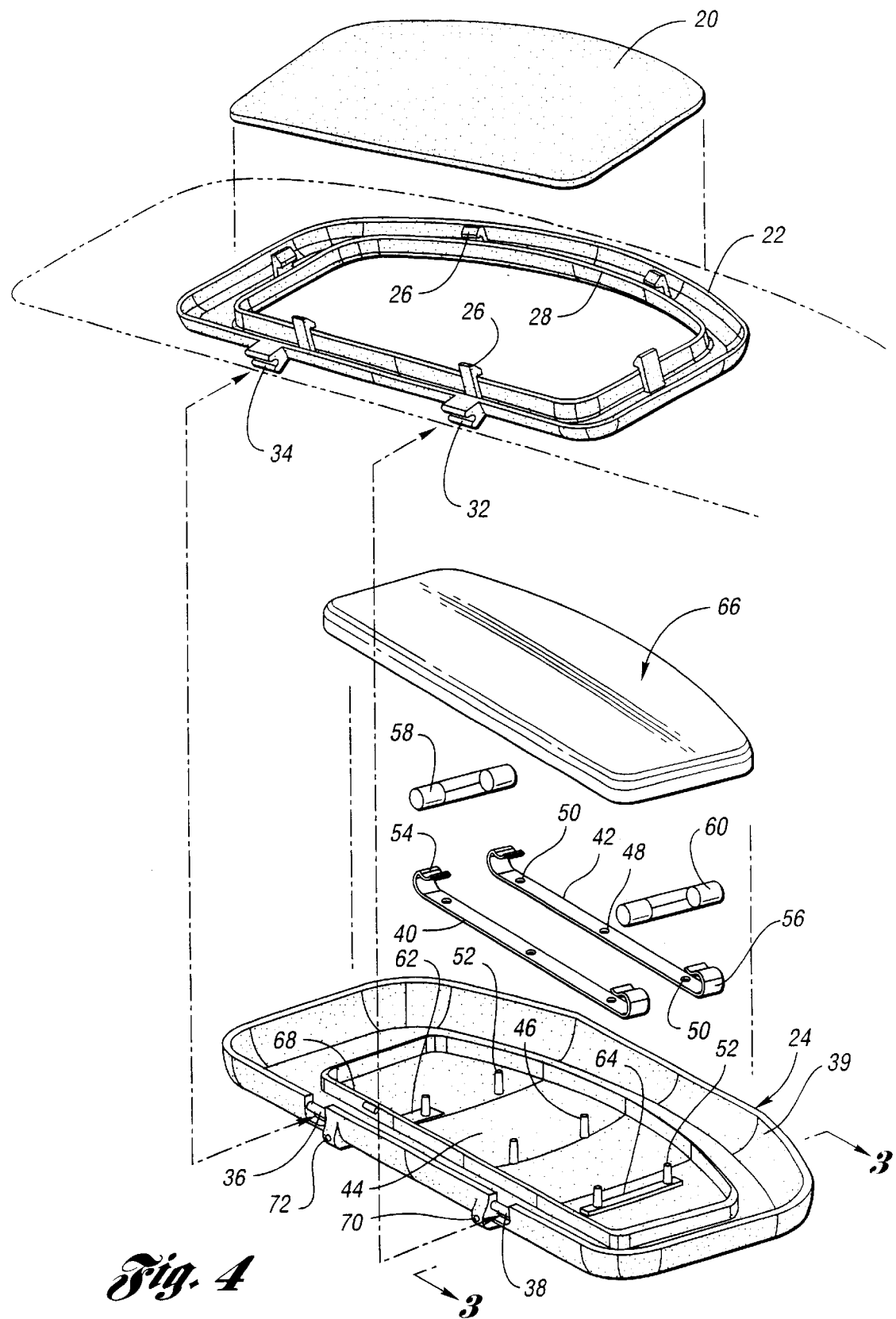

SUN VISOR AND VANITY MIRROR ASSEMBLY FOR MOTOR VEHICLES

TECHNICAL FIELD

The invention relates to a visor assembly for use in a passenger compartment of an automotive vehicle, and particularly to improvements in a lighting circuit for illuminating a vanity mirror.

BACKGROUND ART

It is known in the automobile industry to use sun visors that are pivoted on a vehicle headliner at the upper margin of a vehicle windshield. Typically, the visor includes a visor body that is molded or formed from structural material such as polymer or fiberboard. A lighted vanity mirror located on one side of the visor can be moved to an operative position for the convenience of a vehicle passenger by tilting the visor about a pivotal axis at the vehicle headliner. A wiring harness or other electric circuit structure is formed in the visor for the purpose of illuminating visor lamps. Usually the lamps are located at each lateral side of the mirror.

The wiring circuit for the lamps extends through the interior of the visor and through a mounting bar for the visor. The mounting bar in turn is secured to the headliner. A vanity door or lid typically covers the vanity mirror when the mirror is not in use. The door is pivoted on the visor at the upper margin of the mirror. When the mirror is in a generally vertical position, a mechanical switch is activated upon movement of the door, thereby illuminating the lamps on the lateral sides of the mirror.

Examples of prior art constructions of this type may be seen by referring to U.S. Pat. Nos. 5,203,623, 5,117,337, and 4,760,503. An example of a prior art switch for activating and deactivating a lamp circuit for a lighted automotive vanity mirror is disclosed in U.S. Pat. No. 4,751,618. The switch disclosed in the '618 patent comprises a ball contact member, which rolls under the force of gravity from an inoperative position to an operative position when the mirror assumes a vertical disposition. The ball contact member thus contacts electrical circuit terminals for the vanity lights.

It is also known to provide mirror illuminating lights for a lighted automotive vanity mirror by providing a lamp assembly supported by an overhead structural headliner member of a vehicle body at a location adjacent to a pivot axis for a visor, the visor mirror being mounted on one surface of the visor so that it is illuminated by the overhead lamps on the headliner.

Prior art illuminated vanity mirror constructions typically are relatively complex, and the on/off switches that control the lighting for the vanity mirror are subject to wear and failure after repeated use. Further, it is necessary in constructions of this type to use wires in the lighting circuit that pass from a vanity mirror bezel or from the sun visor body into the vanity door or lid, particularly in those prior art designs that employ a mechanical switch assembly activated by opening and closing the vanity door.

DISCLOSURE OF INVENTION

It is an objective of the invention to provide an illuminated sun visor assembly for an automotive vehicle that is substantially less complex in construction and more reliable in operation than known automotive visor assemblies. This is accomplished by providing a vanity mirror light wiring circuit, including electrical conductors embedded in a vanity mirror door, that is made by an injection molding process or similar molding processes in which the electrical conductors are formed as an integral part of the door itself. The ends of conductors embedded in the door are exposed, thereby providing connector switch terminals. A companion connector strip is connected to a frame for a vanity mirror glass. The frame, in turn, is mounted on the surface of a sun visor. The sun visor encloses a portion of the wiring harness for the lamps.

When the door is in its closed position, the glass mirror is covered. In the case of prior art designs, such as the design of the '503 patent, the door is hinged at one margin of the frame for the mirror glass.

When the door of the assembly of the invention is moved to an open position to expose the mirror, the switch terminals engage connector strips on the frame, thereby closing the lighting circuit for the lamps. The lamps themselves form a part of the assembly that includes the door. Thus, there is no need for wires in the lighting circuit to pass from the vanity bezel to the vanity door or from the sun visor to the door. Furthermore, there is no need for a mechanical on/off switch to complete the lighting circuit. This improves the reliability of the lighted mirror and visor assembly.

In practicing the invention, a visor support bracket is secured to and pivoted on a headliner of a vehicle passenger compartment. A mirror glass and frame are secured to one side of the visor. A molded door is hinged on the frame for pivotal movement about an axis generally parallel to the headliner. AT least one electric lamp is mounted on the door and a first pair of electrically conductive connector strips is molded within the door to define in part a lamp circuit.

One end of each connector strip extends to the exterior of the door. A second pair of electrically conductive connector strips is secured to the frame and extends from the frame where they are engaged by the ends of the first pair of connector strips to complete the circuit for the lamp.

BRIEF DESCRIPTION OF DRAWINGS

FIG. 2 is a cross-sectional view of the mirror and door assembly of the invention as seen from the plane of section line 2—2 of FIG. 1a;

FIG. 4 is an exploded, perspective assembly view showing the components of the door and vanity mirror assembly.

BEST MODE FOR CARRYING OUT THE INVENTION

Figure 1:
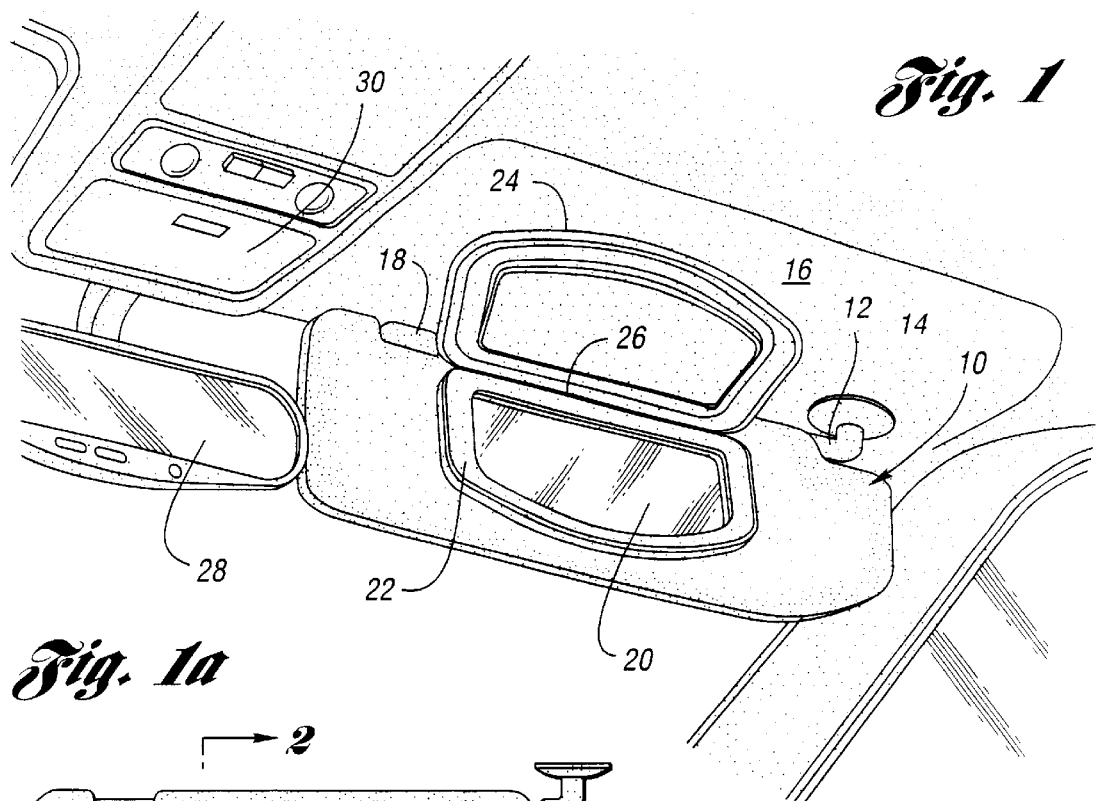
FIG. 1 is a schematic, isometric view of a sun visor assembly of the invention together with a mirror and visor mirror door mounted on one surface of the visor in a vehicle passenger compartment.

FIG. 1 shows a sun visor 10, which is hinged on a visor support rod 12. A cantilever support 14 for the rod 12 maintains the rod 12 in a transverse, generally horizontal position on the headliner 16 for the passenger compartment of an automotive vehicle. The visor 10 is adapted to pivot about the support bar 12 in known fashion. A hinge clamp 18 is located at the extended end of the rod 12 for providing lateral support for the visor. This provides a hinged connection with the headliner, as in the case of many prior art visor constructions.

A mirror 20 with a frame or bezel 22 is secured in known fashion to the visor 10. The door or lid 24 is hinged at one margin 26 of the bezel and mirror assembly. The door is shown in the open position in FIG. 1.

For purposes of orientation, it is noted that the visor is mounted on one side of a rearview mirror 28 for the vehicle adjacent an overhead console 30 for the passenger compartment.

Figure 1A:
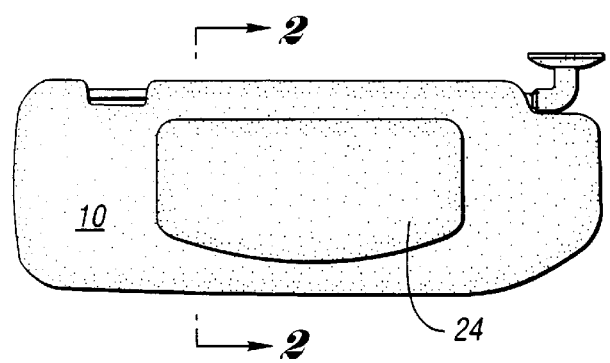
FIG. 1a is a schematic view of the visor seen in FIG. 1 when the visor vanity mirror door is closed.

FIG. 1a is a plan view of the vanity mirror and door assembly of FIG. 1, although the door is shown in the closed position.

Figure 2:
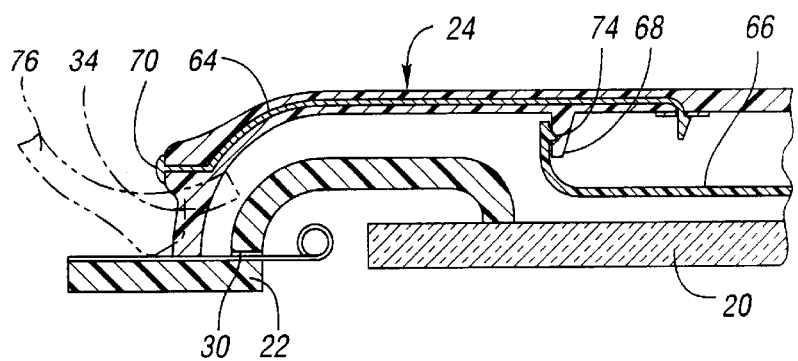

FIG. 2 is a cross-sectional view taken along section line 2—2 of FIG. 1a. The mirror glass 20 is surrounded by the frame 22, which in turn is secured to the surface of the visor 10, as previously described.

The frame 22 has two long sides and two short sides, which generally define a rectangular configuration. Clips 26 are molded to the frame 22 at peripherally spaced locations, as indicated in FIG. 4.

An enlarged detail of the mirror glass 20 and the frame 22 also is shown in FIG. 4. The frame 22 includes a peripheral ridge 28, which engages one side of the mirror glass 20. Peripheral margin 28 and the clips 26 hold the mirror glass 20 securely in place in the frame 22.

Figure 3:
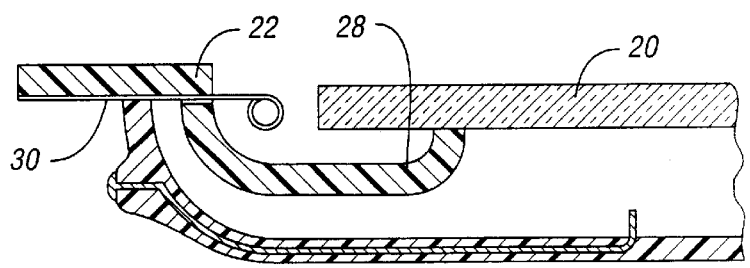
FIG. 3 is a partial cross-sectional view, similar to FIG. 2, as seen from the plane of section line 3—3 of FIG. 4, in which the relative positions of the door and the glass mirror are interchanged to conform with the perspective of FIG. 4.

Electrical connector strip 30 is molded in the frame 22, as indicated in FIG. 3. The connector strip 30, which extends outward from the frame, is connected to a lighting circuit including wires that are embedded in the visor 10.

One margin of the frame 22 has a pair of hinge brackets 32 and 34, as indicated in FIG. 4. These brackets engage hinge pins 36 and 38, respectively, formed on one margin of door frame 39. The frame 39 is designed with generally the same profile as the frame 22 and covers the frame 22 when the door is in its closed position.

Connector strips, which are electrically conductive, are shown at 40 and 42 in FIG. 4. They are secured to the inner surface 44 of the door 24 by means of fasteners 46 received in a fastener opening 48 in each of the strips 40 and 42. The fasteners 46 are molded to the inner surface 44 of the door 24.

Connector strips 40 and 42 also have end openings 50 that receive molded fasteners 52. The ends of the connector strips 40 and 42 form clips 54 and 56 at their opposite ends. These secure the ends of electric light bulbs 58 and 60.

A connector strip 62 engages one end of connector strip 40, and a companion connector strip 64 engages connector strip 42. The connector strips 62 and 64 are molded within the door 24, as best seen in FIG. 4.

A lens 66, which by preference is translucent, is seen in the exploded view of FIG. 4. It is received over the surface 44 of the door 24. The peripheral margin of the lens 66 engages and is supported by a peripheral ridge 68 molded or otherwise secured directly to the surface 44 of the door 24. The lens 66 diffuses the light emitted by the bulbs 58 and 60.

Each of the connector strips 62 and 64 includes a contact button, one being shown in FIG. 2 at 70. Although the connector strip 62 is not visible in a cross-sectional view of FIG. 2, a corresponding contact 72 is provided for the connector strip 62. This is visible in the exploded view of FIG. 4.

The ridge 68 includes a recess that engages a projection 74 on the margin of the lens 66, thereby holding the lens 66 in place, as indicated in FIG. 2.

When the door 24 is pivoted on the hinge pins 36 and 38, it will assume the dotted line position 76 shown in FIG. 2.

The contact point 70 will contact the connector strip 30 on the frame 22. Similarly, contact point 72 will contact the other connector strip (not shown), which corresponds to the connector strip 30.

Each of the connector strips on the frame 22 is connected to wiring embedded in the visor 10, as explained previously. Thus, when the door 24 is tilted from the closed position, shown in FIG. 2, to the open position, the circuit for the light bulbs 58 and 60 is completed, thereby illuminating the mirror glass as electric power is distributed to the light bulbs. Thus, the door itself acts as a vanity on/off switch. No separate wiring harness or wires need be routed from the vanity bezel to the vanity door. Neither is there a requirement for a separate mechanical on/off switch.

Although a preferred embodiment of the invention has been disclosed, modifications may be made by persons skilled in the art without departing from the teachings of the invention. All such modifications and equivalents thereof are included within the scope of the following claims.

What is claimed is:

1. A lighted visor and vanity mirror assembly for a vehicle passenger compartment comprising:

a visor panel, a visor panel support bracket secured to a headliner portion of the passenger compartment, the visor panel being pivotally mounted on the support bracket;

a mirror frame secured to one side of the visor panel, a mirror glass being mounted in the mirror frame;

a molded door hinged at one margin thereof on the frame for pivotal movement about an axis generally parallel to the headliner;

at least one electric light mounted on one side of the door;

a first pair of electrically conductive connector strips molded within the door and forming in part an electric circuit for the electric light;

one end of each connector strip extending to the exterior of the door, each connector strip end defining an electric contact;

a second pair of electrically conductive connector strips secured to the frame and extending from the frame at locations in alignment with the electric contacts at the ends of the connector strips of the first pair whereby the ends engage the connector strips of the second pair to complete the electric circuit for the electric light.

2. The visor and vanity mirror assembly of claim 1 wherein a pair of electric lights is mounted on one side of the door at opposite margins of the mirror glass, each connector strip of said first pair being electrically connected to each of said electric lights.

3. The visor and vanity mirror assembly defined in claim 2 including a light diffusing lens secured to the door and covering the electric lights;

the first pair of connector strips, the electric lights and the lens forming a door subassembly that is mounted on the frame for pivotal movement between a closed position over the mirror glass and an open position wherein light emitted through the lens illuminates the mirror glass.

4. The visor and vanity mirror assembly defined in claim 2 wherein the second pair of connector strips is molded in the frame as an integral part of a molded frame subassembly, the first pair of connector strips forming an integral part of a molded door subassembly.

* * * * *